United States Patent [19]

Woessner

[11] Patent Number: 5,439,085

[45] Date of Patent: Aug. 8, 1995

[54] OSCILLATION DAMPER

[75] Inventor: Felix Woessner, Schweinfurt, Germany

[73] Assignee: Fichtel & Sachs AG, Schweinfurt, Germany

[21] Appl. No.: 238,806

[22] Filed: May 6, 1994

Related U.S. Application Data

[63] Continuation of Ser. No. 157,837, Nov. 24, 1993, abandoned, which is a continuation of Ser. No. 71,944, Jun. 3, 1993, abandoned, which is a continuation of Ser. No. 738,155, Jul. 30, 1991, abandoned.

[30] Foreign Application Priority Data

Aug. 6, 1990 [DE] Germany ............... 40 24 920.4

[51] Int. Cl.⁶ .................. F16F 9/46; B60G 17/08
[52] U.S. Cl. .................................. 188/299; 188/318
[58] Field of Search ............ 188/299, 315, 322.14, 188/322.13, 318; 280/714

[56] References Cited

U.S. PATENT DOCUMENTS

| 4,650,042 | 3/1987 | Knecht et al. | 188/299 |
|---|---|---|---|
| 4,749,070 | 6/1988 | Moser et al. | 188/299 |
| 4,802,561 | 2/1989 | Knecht et al. | 188/318 |
| 4,850,460 | 7/1989 | Knecht et al. | 188/299 |
| 4,880,086 | 11/1989 | Knecht et al. | 188/299 |

FOREIGN PATENT DOCUMENTS

| 2596124 | 9/1987 | France . | |
|---|---|---|---|
| 3348176C2 | 2/1988 | Germany . | |
| 3609862C2 | 3/1988 | Germany . | |
| 3434877C2 | 4/1988 | Germany . | |
| 3719113 | 8/1988 | Germany . | |
| 3712477C2 | 4/1989 | Germany . | |
| 3807322 | 7/1989 | Germany . | |
| 2234041 | 1/1991 | United Kingdom | 188/318 |
| 8905929 | 6/1989 | WIPO . | |

Primary Examiner—Josie A. Ballato
Attorney, Agent, or Firm—Brumbaugh, Graves, Donohue & Raymond

[57] ABSTRACT

In an oscillation damper with bypass between an annular working chamber and a compensating chamber, a shut-off valve is provided in the bypass. The shut-off valve is on the one hand exposed to the pressure in the annular working chamber and on the other hand to the pressure in a control chamber which is constructed directly adjacently to a valve shut-off element of the shut-off valve and is supplied by a throttle section with the pressure in the annular working chamber. The control chamber is constructed with a control chamber outlet. This control chamber outlet is opened or closed selectively by a cross section dimensioning module.

47 Claims, 11 Drawing Sheets

OSCILLATION DAMPER

This is a continuation application of application Ser. No. 08/157,837, filed Nov. 24, 1993 (now abandoned), which was a continuation application of application Ser. No. 08/071,944, filed Jun. 3, 1993 (now abandoned), which was a continuation application of application Ser. No. 07/738,155, filed Jul. 30, 1991 (now abandoned).

BACKGROUND OF THE INVENTION

The invention relates to an oscillation damper comprising a cylinder with an axis, a piston rod axially movably guided through at least one cylinder end, a piston connected to the piston rod inside the cylinder, a plurality of fluid chambers having capacities which are variable relative to one another as a function of the movement of the piston rod relative to the cylinder and fluid connections between fluid chambers, wherein in at least one fluid connection, and more particularly in a fluid connection which is provided on the cylinder, there is provided a shut-off valve component, and more particularly a shut-off valve component fixed with respect to said cylinder, between two portions of this fluid connection, wherein moreover the shut-off valve component is constructed with at least one valve seat to which a first portion is attached, wherein moreover a first side of the valve shut-off element can be elastically pressed against the valve seat while shutting off the first portion, wherein moreover a second side of the valve shut-off element, which is remote from the first side, of the valve shut-off element can be loaded adjacently to a control chamber by the fluid pressure in this control chamber, wherein moreover the control chamber is attached via a throttle section passing through the valve shut-off element to the first portion, wherein moreover the control chamber communicates via a control chamber outlet with the second portion and wherein this control chamber outlet is allocated an outlet cross section dimensioning device.

STATEMENT OF THE PRIOR ART

An oscillation damper of this type is known from DE-PS 36 09 862. With the known oscillation damper, the outlet cross section dimensioning device of the control chamber outlet is spatially separated from the valve shut-off element designed as a tightly clamped diaphragm. No statements are made about the construction of the outlet cross section dimensioning device.

OBJECT OF THE INVENTION

The object of the invention is to allow a compact and small-sized valve component structure in an oscillation damper of the type described at the outset.

SUMMARY OF THE INVENTION

An oscillation damper comprises a cylinder with an axis, a piston rod axially movably guided through at least one cylinder end. A piston is connected to the piston rod inside the cylinder. A plurality of fluid chambers are provided within the cylinder, said fluid chambers having capacities which are variable relative to one another as a function of the movement of the piston rod relative to the cylinder. Fluid connections are provided between fluid chambers. At least one fluid connection may be disposed on the cylinder. In at least one fluid connection there is provided a shut-off valve component, which may be substantially rigidly arranged on the cylinder. The shut-off valve component is provided between two portions of this fluid connection. The shut-off valve component is constructed with at least one valve seat to which a first portion is attached. Moreover, a first side of a valve shut-off element can be elastically pressed against the valve seat while shutting off the first portion. A second side of the valve shut-off element, which is remote from the first side, of the valve shut-off element can be loaded adjacently to a control chamber by the fluid pressure in this control chamber. The control chamber is attached via a throttle section passing through the valve shut-off element to the first portion. The control chamber communicates via a control chamber outlet with the second portion. The control chamber outlet is allocated an outlet cross section dimensioning device.

The outlet cross section dimensioning device comprises a cross section dimensioning module which is adjustable substantially perpendicularly to the second side of the valve shut-off element in at least one direction by magnetic force and, in co-operation with the second side of the valve shut-off element, determines the outlet cross section of the control chamber outlet.

With the construction according to the invention of the oscillation damper, the outlet cross section dimensioning device is therefore constructed adjacently to the valve shut-off element. The valve shut-off element adopts an additional role, apart from its valve shut-off function, as part of the outlet cross section dimensioning device. A structure which is particularly economical in parts and space is thus produced.

In order further to increase the compactness and smallness of the shut-off valve component, it is recommended that the valve shut-off element and the cross section dimensioning module be arranged concentrically with a circular contour and that the throttle section passing through the valve shut-off element is arranged radially inside a sealing position formed between the valve shut-off element and the cross section dimensioning module.

It is possible for the valve shut-off element to be pretensioned against the valve seat by a valve pretensioning spring; it is possible, additionally or alternatively, for the valve shut-off element to be pretensioned elastically within itself and against the valve seat. The valve pretensioning spring and the internal initial tension of the valve shut-off element allow the shut-off valve to behave as a conventional pressure-dependent valve, when the valve shut-off element is not kept closed by the pressure in the control chamber, and to be designed with different damping characteristics depending on the choice of initial tension.

It is basically possible to make the control chamber outlet continuously variable, for example by a continuous magnetic adjustment, dependent on the control current, of the cross section dimensioning module so that the opening of the shut-off valve is also continuously variable. However, the cross section dimensioning module is preferably adjustable between a closed position and an open position without intermediate positions, the control chamber outlet being closed to a maximum in the closed position and the control chamber outlet being opened to a maximum in the open position. When the control chamber outlet is opened to a maximum, the shut-off valve behaves as a high value damping valve consisting of a pressure-dependent valve and of a pre-opening cross section/acting parallel thereto.

For simple adjustment of the cross section dimensioning module, it is proposed that this module is pretensioned toward a closed position by a pretensioning device and is transferable into an open position by magnetic force.

To enable the shut-off valve to be kept closed in the first portion with a high closure force against the fluid pressure when the control chamber outlet is closed, without a high magnetic force or spring force having to be exerted on the cross section dimensioning module, it is proposed that the valve shut-off element offers, on its first side facing the first portion, to the fluid inside the first portion a first loading cross section which is equal to or smaller than a second loading cross section which is located on the second side of the valve shut-off element and is loaded by the fluid inside the control chamber. For example, the first loading cross section can be between 15–40%, preferably about 20% of the second loading cross section.

To enable the cross section dimensioning module to be displaced with low magnetic force and low initial spring tension, it is proposed that the cross section dimensioning module is pressure loaded by the fluid contained inside the control chamber both at its end facing the valve shut-off element and at its end turned away from the valve shut-off element. This solution can be further optimised by suitable adaptation of the loaded cross sections at the two ends.

The cross section dimensioning module can be adjusted, for example, in that the cross section dimensioning module comprises a magnet armature which is loaded by a dimensioning member pretensioning device and can be magnetically adjusted against the action of this dimensioning member pretensioning device. It is recommended that the magnet armature is pretensioned toward the valve shut-off element by the dimensioning member pretensioning device.

This last solution has the advantage that, should the current influencing the magnet armature be cut off, the shut-off valve closes and a rigid setting of the shock absorber is thus achieved.

It may be advantageous if, between the magnet armature and the valve shut-off element, there is arranged an intermediate member which, on the one hand, can be loaded by the magnet armature and, on the other hand, co-operates with the valve shut-off element. The magnet armature then needs to fulfill substantially only magnetic and force-transmitting functions, while the valve functions are allocated to the intermediate member as a special part. This embodiment is particularly advantageous if the intermediate member engages with the magnet armature in the manner of a ball and socket joint. This last solution simplifies mechanical production as it makes the valve functions independent of exact alignment of the magnet armature and the valve shut-off element.

According to a first variation, the intermediate member can be bell-shaped in construction, the vertex region of the bell-shaped intermediate member resting against the magnet armature and the edge region of the intermediate member cooperating with the valve shut-off element. With this embodiment, a substantial part of the control chamber can be placed inside the bell-shaped intermediate member and the external surface of the bell member can serve to produce the ball-joint connection to the magnet armature, particularly if the bell-shaped intermediate member is received in a recess in the magnet armature.

If the bell-shaped intermediate member can be applied in a sealing manner against the magnet armature outside its vertex region and if a pressure compensating connection to the rear of the magnet armature is to be produced, a connecting bore which communicates with a bore in the armature can be provided in the vertex region of the bell-shaped intermediate member.

Since a radially outwardly directed marginal flange is arranged on the bell-shaped intermediate member, the requirement for the first loading cross section to be substantially smaller than the second loading cross section can easily be satisfied while maintaining a compact small mode of construction.

It may be advantageous if the intermediate member is pretensioned in the direction of engagement with the valve shut-off element by an intermediate member pretensioning device. This measure allows greater freedom of shaping in the dimensioning of the pressure effect faces at the two ends of the cross section dimensioning module.

According to a particularly simple embodiment, the intermediate member can also be formed by an optionally resilient annular disc, the ball-joint engagement between the magnet armature and the intermediate member again being easily possible here in that a convex spherical dome is shaped roughly at the end of the magnet armature directed toward the intermediate member.

It is also possible for the magnet armature to cooperate directly with the valve shut-off element. In this case, the magnet armature simultaneously fulfills force transmission and valve functions and the construction is particularly simple.

It is also possible for the cross section dimensioning module to form, with the valve shut-off element, a sliding seat with a sliding direction which is substantially perpendicular to the second side of the valve shut-off element.

In order to build up sufficient pressure in the control chamber even if leakages from the control chamber have to be allowed for, the throttle section must have a certain minimum cross section between the first portion and the control chamber. This minimum cross section could be too great as a preliminary opening for a specific desired damping characteristic.

To allow these two contradictory requirements to be satisfied, it is also proposed that in the connection between the first portion and the control chamber there is provided an auxiliary valve arrangement which is actuable by the cross section dimensioning module and constricts the throttle section when the outlet cross section of the control chamber is enlarged and widens the throttle section when the outlet cross section of the control chamber outlet is reduced.

Again with respect to a compact and small-sized arrangement of the valve component it is proposed that the valve seat limits a central mouth arrangement of the first portion and that the valve shut-off element and the cross section dimensioning module are arranged concentrically to the central mouth arrangement. A field winding acting upon the cross section dimensioning module and/or spring pretensioning means acting upon the valve shut-off element and/or spring pretensioning means acting upon the cross section dimensioning module can also be arranged concentrically to the central mouth arrangement.

The shut-off valve can be disposed on the cylinder casing such that a central channel of the first portion leading to the valve seat, the direction of movement of the valve shut-off element and the direction of movement of the cross section dimensioning module lie substantially radially to the cylinder axis.

Alternatively, it is possible for the shut-off valve to be positioned concentrically to the cylinder axis in an annular space between piston rod and cylinder in the region of the cylinder end traversed by the piston rod.

The invention can be applied, in particular, with twin tube oscillation dampers in which two working chambers are formed inside the cylinder by the piston, namely a first working chamber between the piston and a base end of the cylinder and a second working chamber inside the cylinder between the piston and the end of the cylinder traversed by the piston rod and in which a compensating chamber is provided, wherein the two working chambers are filled with pressure liquid and the compensating chamber is filled partially with pressure liquid and partially with gas, wherein moreover the first working chamber is connected to the compensating chamber by a base valve arrangement, wherein moreover the two working chambers are connected to one another by a piston valve arrangement, wherein moreover the second working chamber is connected via a bypass to the compensating chamber and wherein the shut-off valve is arranged in the bypass line.

With such an oscillation damper, the valve arrangements are frequently adapted to one another such that the piston valve arrangement has a greater flow resistance during an extension movement of the piston rod relative to the cylinder than during a retraction movement of the piston rod relative to the cylinder and such that the base valve arrangement has a greater flow resistance during the retraction movement of the piston rod relative to the cylinder than the piston valve arrangement such that a flow takes place from the second working chamber through the bypass line to the compensating chamber both during a retraction movement and during an extension movement. However, the construction according to the invention of the oscillation damper is suitable, in particular, solely for a throughflow of the damping liquid through the shut-off valve in a single direction of flow and the construction according to the invention of the shut-off valve component is therefore of particular importance for the aforementioned types of twin tube oscillation damper.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereinafter with reference to an embodiment shown in the accompanying drawings in which.

DETAILED DESCRIPTION OF THE PREFERRED EMBODIMENT

Figure 1:
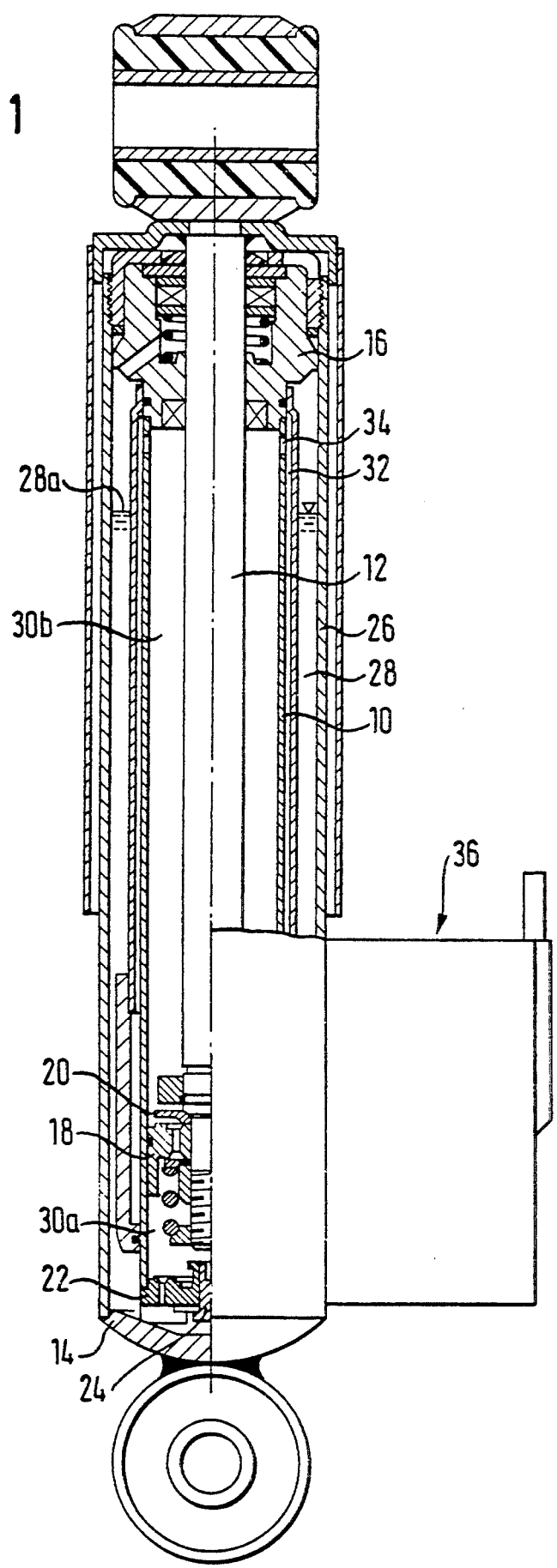
FIG. 1 shows an oscillation damper with bypass and shut-off valve in the bypass.

In FIG. 1, the cylinder of an oscillation damper is designated by 10 and the piston rod by 12. The cylinder is terminated at the bottom by a base 14. The piston rod 12 is guided through a guide and sealing unit 16 out of the upper end of the cylinder. A piston unit 18 with a piston valve arrangement 20 is fastened on the piston rod 12 inside the cylinder 10. The lower end of the cylinder is terminated by a base plate 22 with a base valve arrangement 24. The cylinder 10 is surrounded by a container tube 26. An annular space or chamber 28 which represents a compensating chamber is formed between the container tube 26 and the cylinder 10. The space inside the cylinder 10 is divided by the piston unit 18 into a first working chamber 30a and a second working chamber 30b. The working chambers 30a and 30b are filled with pressure liquid. The compensating chamber 28 is filled to level 28a with pressure liquid and above level 28a with gas. Inside the compensating chamber there is formed a first line section 32 which communicates via a bore 34 of the cylinder with the second working chamber 30b. A shut-off valve unit 36 mounted laterally on the container tube 26 is attached to this first line section. A second line section (not shown), leads from here to the compensating chamber 28.

When the piston rod 12 travels upwardly out of the cylinder 10, the upper working chamber 30b is reduced. In the upper working chamber 30b there is formed an excess pressure which can be reduced into the lower working chamber 30a by the piston valve arrangement 20 providing that the shut-off valve unit is closed. When the shut-off valve unit 36 is opened, liquid simultaneously flows from the upper working chamber 30b through the portion 32 and the shut-off valve unit 36 into the compensating chamber 28. The damping characteristic of the oscillation damper during extension of the piston rod is therefore dependent on whether the shut-off valve arrangement 36 is open or closed.

When the piston rod 12 travels into the cylinder 10, an excess pressure is formed in the lower working chamber 30a. Liquid can pass from the lower working chamber 30a through the piston valve arrangement 20 upwardly into the upper working chamber 30b. The liquid displaced by the increasing piston rod volume inside the cylinder is driven out through the base valve arrangement 24 into the compensating chamber 28. An increasing pressure also occurs in the upper working chamber 30b as the flow resistance of the piston valve arrangement 20 is lower than the flow resistance of the base valve arrangement 24. When the shut-off valve component 36 is opened, this increasing pressure can in turn flow through the first portion 32 into the compensating chamber 28. This means that when the shut-off valve component 36 is opened, the shock absorber, even during retraction, has a softer characteristic when the shut-off valve component 36 is opened and a harder characteristic when the shut-off valve component is closed, as during extension of the piston rod. It should be noted that the direction of flow through the first portion 32 of the bypass is always the same, regardless of whether the piston rod is retracted or extended.

Figure 2:
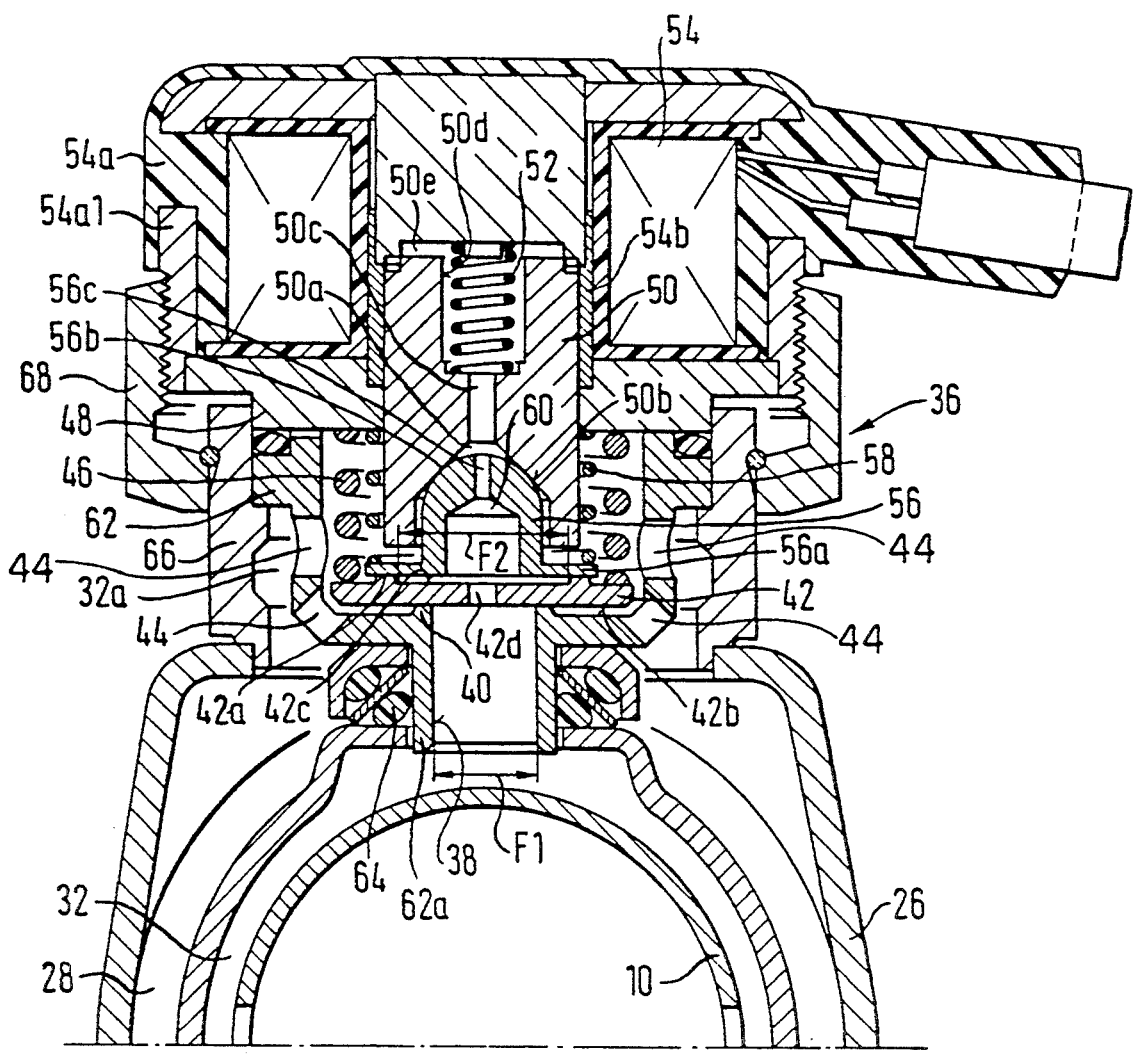
FIG. 2 shows a first and preferred embodiment of the shut-off valve component of the bypass.

FIG. 2 shows the cylinder 10, the first portion 32 of the bypass and the compensating chamber 28 in section.

A central channel 38 pertaining to the valve component 36 is attached to the first portion 32. A valve seat 40 is constructed at the upper end of the central channel 38. A rigid shut-off valve plate 42 rests on the valve seat 40. In this position shown in FIG. 2, the connection between the central channel 38 and the compensating chamber 28 is substantially closed. When the shut-off valve plate 42 lifts from the valve seat 40, liquid can travel from the central channel 38 past the valve seat 40 beneath the shut,off valve plate 42 through bores 44 into the compensating chamber 28. The shut-off valve plate 42 is pretensioned in the direction of the valve seat 40 by a helical compression spring 46 which is supported on a plate 48. Providing only the helical spring 46 acts against the valve shut-off plate 42, the shut-off valve 40, 42 behaves as a spring-loaded valve with a constant preliminary opening 42d, which opens under pressure, is connected parallel to the piston valve arrangement 20 during the upward stroke of the piston rod 12 in FIG. 1 and is connected parallel to the base valve arrangement 24 during the downward stroke of the piston rod 12 in FIG. 1.

The shut-off valve component 36 can be shut off if hard shock absorber characteristics are desired.

A magnet armature 50 is arranged concentrically to the central channel 38 in the shut-off valve component 36. This magnet armature is pretensioned downwardly in the direction of the shut-off valve plate 42 by a magnet armature pretensioning spring 52 and can be pulled upwardly by a field winding 54. A tube member 54b guides the magnet armature 50 in upward-downward direction. An intermediate member 56 which is received by a recess 50a in the magnet armature 50 and has a bell-shaped configuration is arranged between the magnet armature 50 and the shut-off valve plate 42. This intermediate member 56 rests with a marginal flange 56a on an annular rib 42a of the shut-off valve plate 42 (condition according to FIG. 2). The intermediate member 56 rests in the state according to FIG. 2 in an annular zone 56b substantially tightly on a cone 50b of the recess 50a. A bore 56c in the intermediate member traverses the vertex region thereof and is attached to a through-bore 50c of the magnet armature 50 which opens into a spring chamber 50d of the magnet armature in which the magnet armature pretensioning spring 52 is positioned. An intermediate member pretensioning spring 58 which in turn rests on a plate 48 acts on the radial flange 56a of the intermediate member.

The underside of the shut-off valve plate is designated by 42b, the upper side by 42c. In the condition according to FIG. 2, the shut-off valve plate 42 is exposed from below with a loading cross section F1 to the pressure in the central channel 38, i.e. the pressure in the upper working chamber 30b according to FIG. 1. The upper side 42c is exposed to the pressure in the control chamber 60 in an upper loading cross section F2>F1. The pressure in the control chamber—approximately equal to the pressure in the central channel 38 in the condition according to FIG. 2—is conveyed to the control chamber 60 via a throttle bore 42d which traverses the shut-off valve plate 42. The pressure in the control chamber 60 continues through the bore 56c also into the bore 50c, the chamber 50d and the space 50e above the magnet armature 50.

It is now assumed that the field winding 54 is not traversed by current so the magnet armature is pretensioned downwardly against the intermediate member 56 due to the action of the magnet armature pretensioning spring 52, the intermediate member 56 rests on the rib 42a and the shut-off valve plate 42 rests on the valve seat 40. As the pressure in the control chamber 60 is now substantially equal to the pressure in the central channel 38 and acts upon a pressure loading cross section F2 which is greater than the pressure loading cross section F1 loaded by the pressure in the central channel 38, the shut-off valve plate 42 is held against the valve seat with a great holding force. Leakages between the rib 42a and the radial flange 56a, at the annular contact point 56b and at the exterior of the magnet armature 50 are obviously not ruled out. Nevertheless, it can be assumed that, with appropriately great dimensioning of the throttle bore 42d, the pressure in the control chamber 60 is approximately equal to the pressure in the central channel 38.

The magnet armature 50 and the intermediate member 56 should be interpreted together as a cross section dimensioning module 50, 56 which is responsible for the through-flow cross section between the rib 42a and the radial flange 56a.

When the field winding 54 is excited, the magnet armature 50 is pulled upwardly and a control chamber outlet can then form between the annular rib 42a and the radial flange. This control chamber outlet is greater than the throttle cross section of the throttle bore 42d so that the pressure in the control chamber 60 collapses. When the pressure in the control chamber 60 collapses, the dynamic pressure in the central channel 38 can cause the shut-off valve plate 42 to lift against the action of the helical compression spring 46.

Owing to the existence of the spring 58, it is also possible that the radial flange 56a will initially remain seated/when the magnet armature 50 rises on the annular rib 42a. With appropriate dimensioning of the bore 56c in comparison with the cross section of the bore 42d, however, the pressure in the control chamber 60 can then collapse, more specifically over the course via the bore 56c and the opening gap being established in the annular region 56b.

If the shut-off valve 42, 40 is to be closed again, the field winding 54 is de-energised and the magnet armature 50 then presses the intermediate member 56 against the annular rib 42a again. Pressure then builds up in the control chamber 60, this pressure acting upon the greater loading cross section F2 and pressing the shut-off valve plate 42 against the dynamic pressure of the pressure liquid in the central channel 38 against the valve seat 40 again.

The shut-off valve plate 42 is positioned in a pot-shaped insert 62 which has the bores 44 and a length of tube 62a at the bottom. This length of tube forms the central channel 38 and is tightly connected by a seal 64 to the first portion 32 of the bypass. The pot 62 is inserted into a length of tube 66 which is welded to the container 26. The intermediate space between the pot 62 and the length of tube 66 forms a second portion 32a of the bypass.

The portions 32 and 32a together form the bypass. The intermediate plate 48 which, together with the iron parts and housing parts pertaining to the field winding 54 can form a constructional unit, is placed onto the pot 62.

It is also possible to dispose all parts of the solenoid valve component in succession on the length of tube 66 and finally to connect the length of tube 66 by a union nut 68 to the field winding housing 54a or a threaded insert 54a1 of the field winding housing.

It should also be added that the bell-shaped intermediate member 56, together with the recess 50a in the magnet armature 50 forms a ball and socket joint so that alignment errors of the magnet armature guide 54b relative to a valve seat 40 are harmless.

When the armature 50 is attracted, the throttle bore 42d can be interpreted as the preliminary opening passage of a normal pressure-dependent valve through which a small liquid stream can flow from the central channel 38 into the compensating chamber 28. As the liquid supply in the central channel 38 increases, i.e. as the stroke of the piston toward the cylinder 10 speeds up, the shut-off valve plate 42 lifts progressively from the valve seat 40 against the force of the spring 46. The main stream flows through between the valve seat 40 and the shut-off valve plate 42 while a small partial stream flows through the throttle bore 42d and the control space 56 to the compensating space 28.

Figure 3:
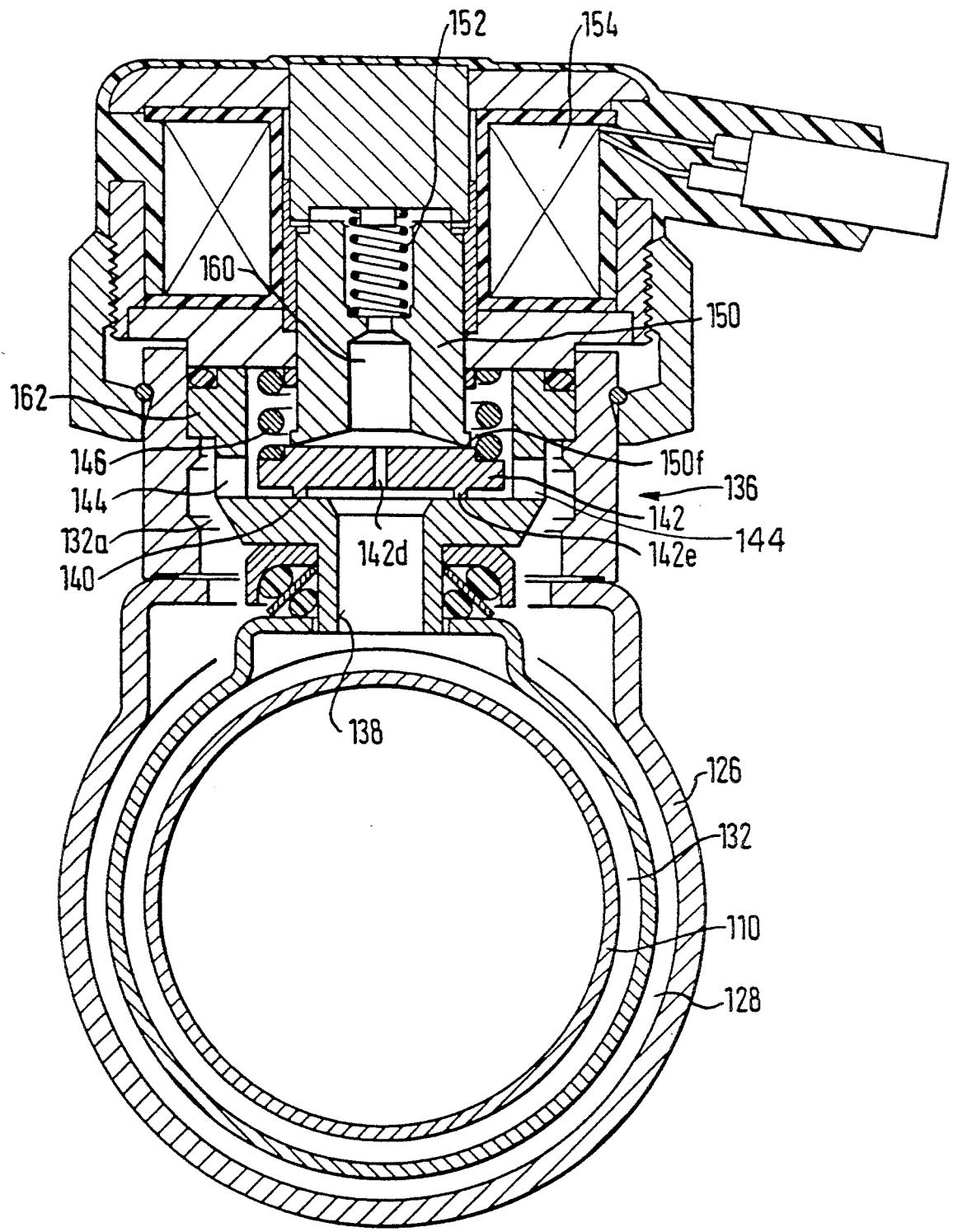
FIG. 3 shows a second embodiment of the shut-off valve component.

FIG. 3 shows a simplified embodiment. Similar parts are provided with the same reference numerals as in FIG. 2, increased by the number 100 in each case. In this embodiment, the shut-off valve plate 142 is provided with an annular margin 142e. The magnet armature 150 co-operates here directly with the shut-off valve plate 142 and rests with its margin 150f on the shut-off valve plate 142. The control chamber 160 is formed inside the magnet armature 150.

FIG. 3 shows the container tube 126, the cylinder 110, the first portion 132 of the bypass, and the compensating chamber 128 in cross section. A central channel 138 pertaining to the valve component 136 connects to the first portion 132. A valve seat 140 is constructed at the upper end of the central channel 138. The shut-off valve plate 142 rests with its annular margin 142e on the valve seat 140. The shut-off valve plate 142 is traversed by a throttle bore 142d connecting the central channel 138 and the control chamber 160.

In the position shown in FIG. 3, the connection between the central channel 138 and the compensating chamber 128 is substantially closed. When the shut-off valve plate 142 lifts from the valve seat 140, liquid can travel from the central channel 138 past the valve seat 140 beneath the shut-off valve plate 142 through bores 144 and the space 132a into the compensating chamber 128. The bores 144 are provided in a pot-shaped insert 162. The shut-off valve plate 142 is pretensioned in the direction of the valve seat 140 by a helical pressure spring 146. A magnet armature 150 is arranged concentrically to the central channel 138 in the shut-off valve component 136. This magnet armature 150 is pretensioned downwardly in the direction of the shut-off valve plate 142 by a magnet armature pretensioning spring 152 and can be pulled upwardly by a field winding 154.

The mode of operation of the embodiment according to FIG. 3 also corresponds to that according to FIG. 2.

Figure 4:
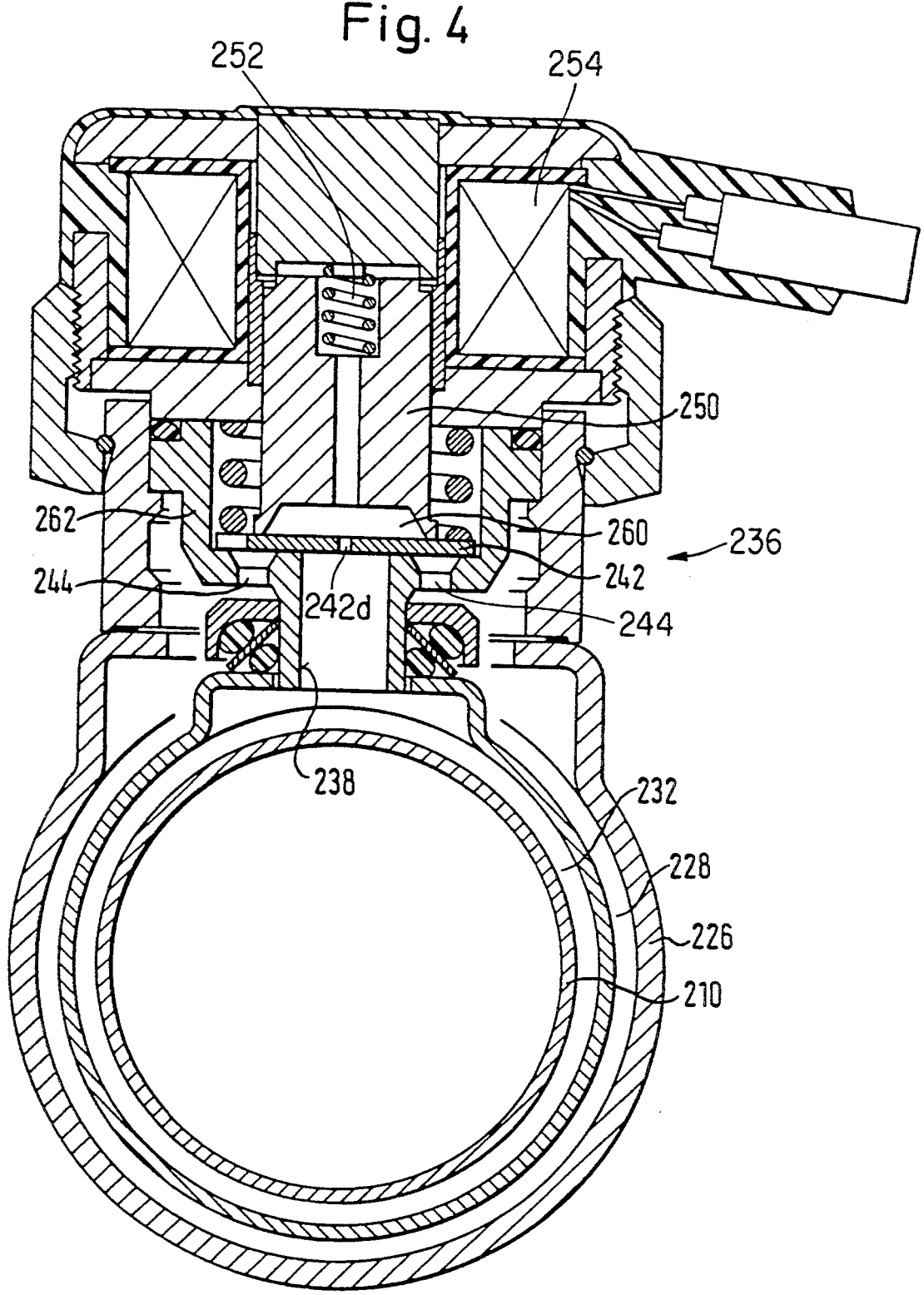
FIG. 4 shows a third embodiment of the shut-off valve component.

In FIG. 4, similar parts are provided with the same reference numerals as in FIG. 2, increased by the number 200 in each case.

In comparison with the embodiment according to FIG. 3, only the arrangement of the outlet bores 244 located beneath the shut-off valve plate 242 and provided in the insert 262 in this case has changed. The mode of operation here also corresponds to the mode of operation of the embodiment according to FIG. 2.

FIG. 4 shows the container tube 226, the cylinder 210, the first portion 232 of the bypass, and the compensating chamber 228 in cross section. A central channel 238 pertaining to the valve component 236 connects to the first portion 232. The shut-off valve plate 242 is traversed by a throttle bore 242d connecting the central channel 238 and a control chamber 260. A magnet armature 250 is arranged concentrically to the central channel 238 in the shut-off valve component 236. The magnet armature 250 is pretensioned downwardly in the direction of the shut-off valve plate 242 by a magnet armature pretensioning spring 252 and can be pulled upwardly by a field winding 254.

Figure 5:
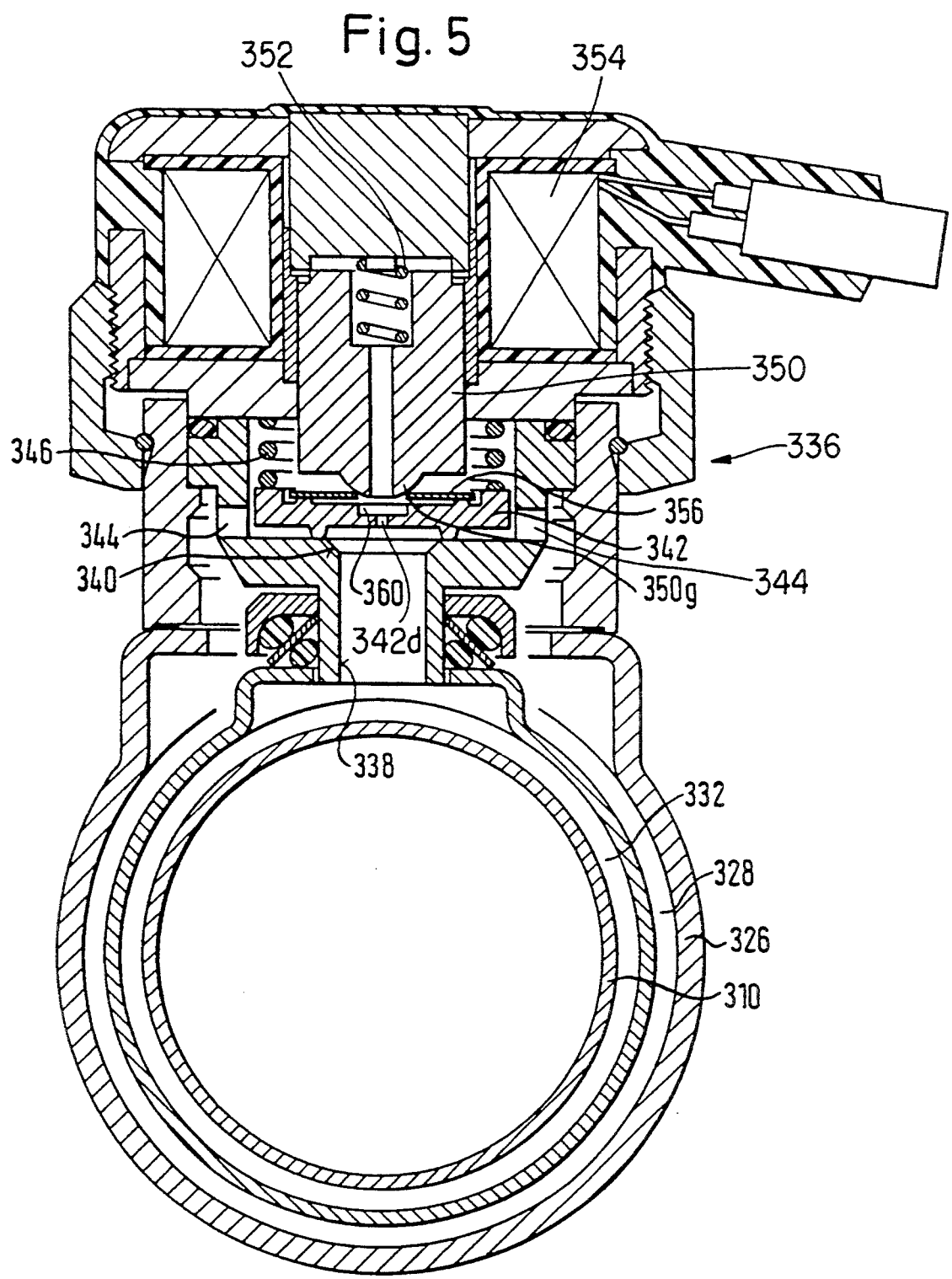
FIG. 5 shows a fourth embodiment of the shut-off valve component.

In FIG. 5, similar parts are provided with the same reference numerals as in FIG. 2, increased by the number 300 in each case.

In this embodiment, the shape of the intermediate member 356 has changed in comparison with the embodiment according to FIG. 2. This intermediate member 356 is formed by a resilient annular disc here, of which the central opening cooperates in the manner of a ball and socket joint with a downwardly direct-by convex partially spherical projection 350g.

FIG. 5 shows the container tube 326, the cylinder 310, the first portion 332 of the bypass, and the compensating chamber 328 in cross section. A central channel 338 pertaining to the valve component 336 connects to the first portion 332. A valve seat 340 is constructed at the upper end of the central channel 338. A rigid shut-off valve plate 342 rests on the valve seat 340. The shut-off valve plate 342 is traversed by a throttle bore 342d connecting the central channel 338 and a control chamber 360.

In the position shown in FIG. 5, the connection between the central channel 338 and the compensating chamber 328 is substantially closed. When the shut-off valve plate 342 lifts from the valve seat 340, liquid can travel from the central channel 338 past the valve seat 340 beneath the shut-off valve plate 342 through bores 344 into the compensating chamber 328. The shut-off valve plate 342 is pretensioned in the direction of the valve seat 340 by a helical pressure spring 346. Magnet armature 350 is pretensioned downwardly in the direction of the shut-off valve plate 342 by a magnet armature pretensioning spring 352 and can be pulled upwardly by a field winding 354.

Furthermore, the mode of operation of this embodiment also corresponds to that of FIG. 2.

Figure 6:
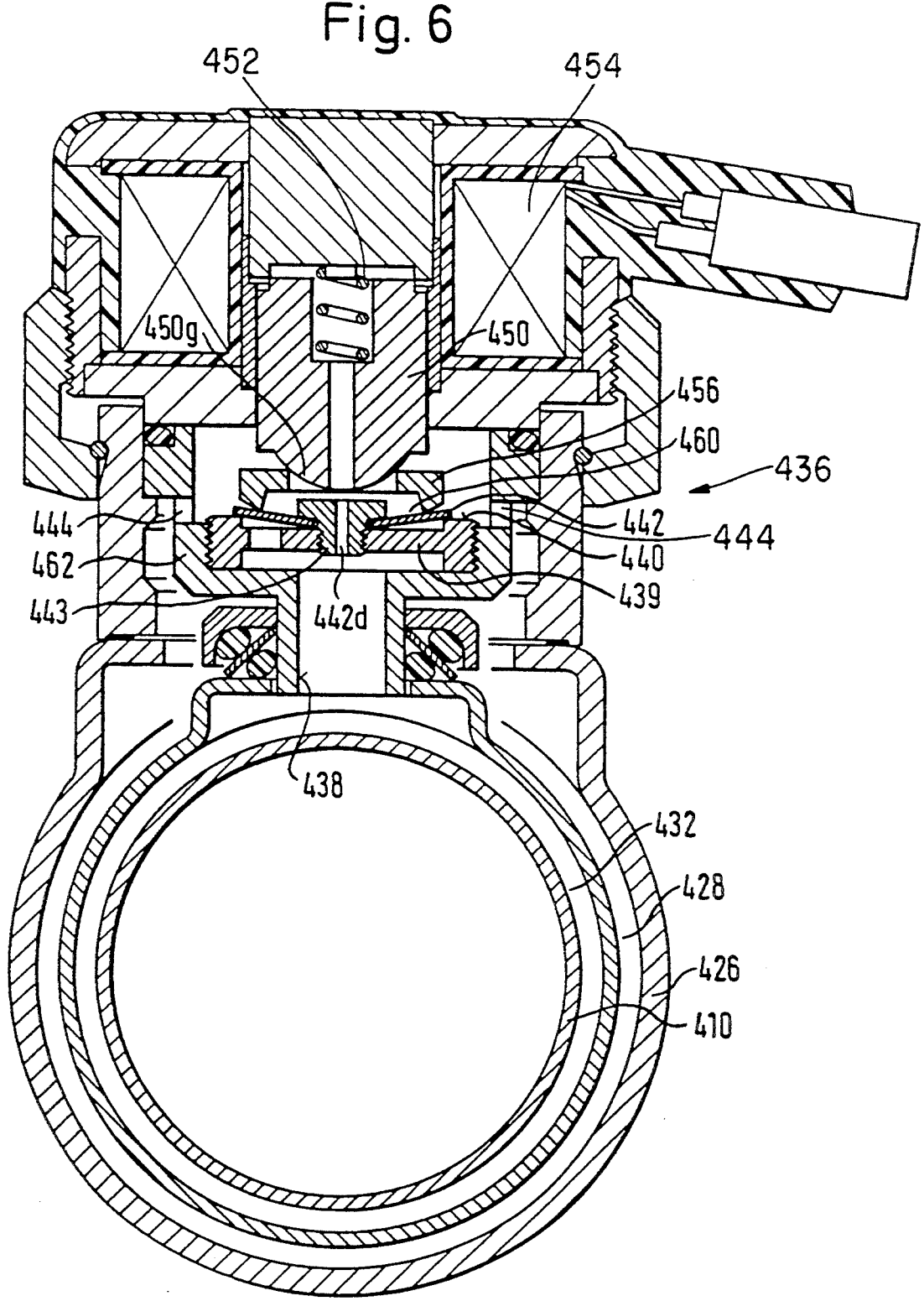
FIG. 6 shows a fifth embodiment of the shut-off valve component.

In FIG. 6, similar parts are provided with the same reference numerals as in FIG. 2, increased by the number 400 in each case.

In this embodiment of the valve shut-off component 436, a valve seat plate 439 on which the valve seat 440 is constructed is inserted over the central channel 438 into the pot-shaped insert 462. This valve seat co-operates with a valve shut-off plate 442 constructed as a Belleville spring washer in this case. The valve shut-off plate is clamped by a nipple 443 on the valve seat plate 439 with its radially inner margin, while the radially outer margin of the shut-off valve plate rests under initial tension on the valve seat 440. The throttle bore 442d extends through the nipple 443 to the control chamber 460. Owing to the initial tension of the valve shut-off plate 442, the helical compression spring 46 in FIG. 2 can be dispensed with. The intermediate member is constructed here as an angle ring 456 which is inserted between the magnet armature 450 and the valve shut-off plate 442. The engagement between the magnet armature 450 and the intermediate member 456 is similar to that in the embodiment according to FIG. 5, by means of a downwardly directed convex partially spherical projection 450g. The behaviour of this arrangement is similar to the behaviour of the arrangement according to FIG. 2.

FIG. 6 further shows the container tube 426, the cylinder 410, the first portion 432 of the bypass, and the compensating chamber 428 in cross section.

In the position shown in FIG. 6, the connection between the central channel 438 and the compensating chamber 428 is substantially closed. When the shut-off valve plate 442 lifts from the valve seat 440, liquid can travel from the central channel 438 past the valve seat 440 beneath the shut-off valve plate 442 through bores 444 provided in the pot-shaped insert 462 into the compensating chamber 428. The magnet armature 450 is pretensioned downwardly in the direction of the shut-off valve plate 442 by a magnet armature pretensioning spring 452 and can be pulled upwardly by a field winding 454.

Figure 7:
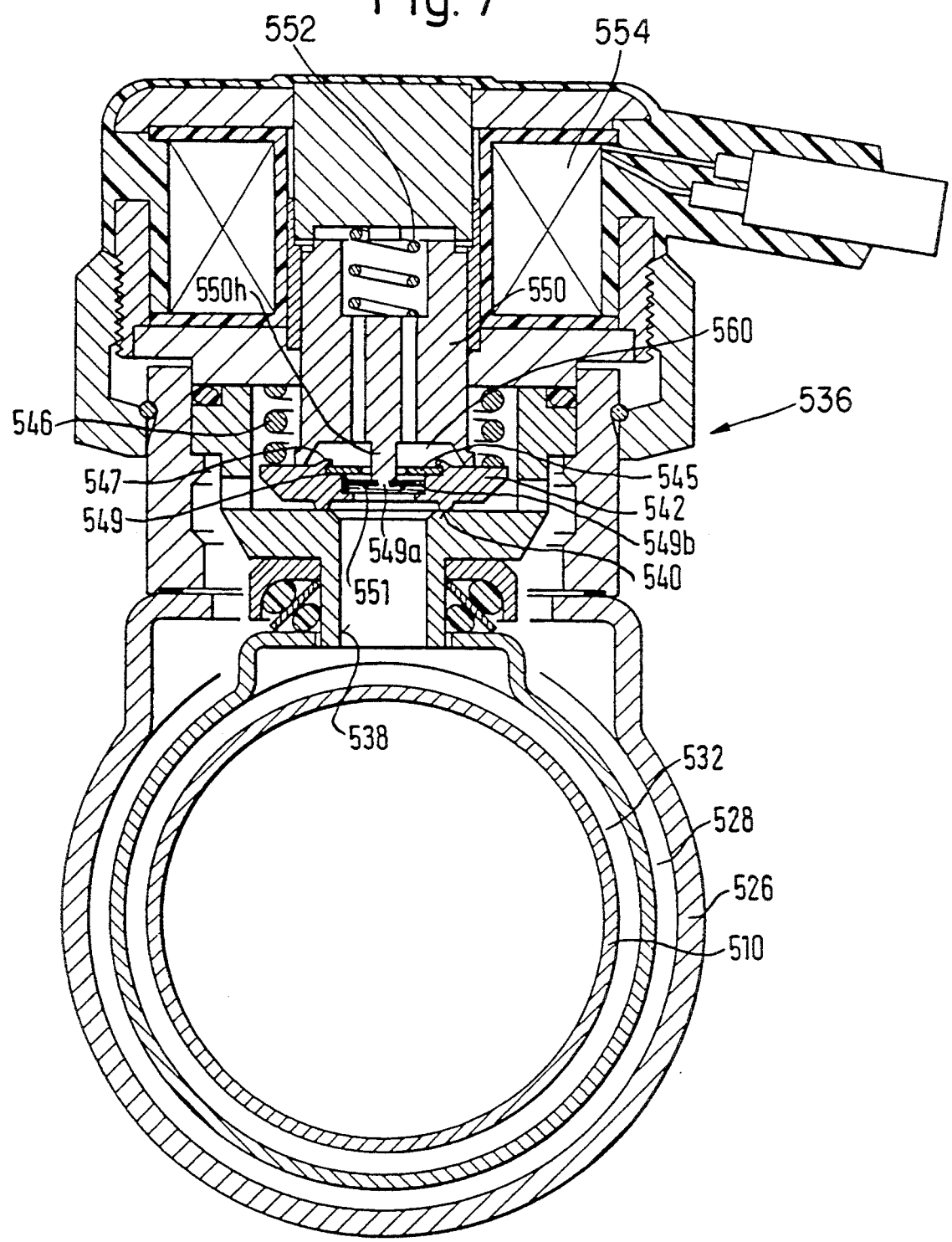
FIG. 7 shows a sixth embodiment of the shut-off valve component.

In FIG. 7, similar parts are provided with the same reference numerals as in FIG. 2, increased by the number 500 in each case.

FIG. 7 shows the container tube 526, the cylinder 510, the first portion 532 of the bypass, and the compensating chamber 528 in cross section.

In this embodiment of the valve component 536, the throttle bore of the shut-off valve plate 542 is constructed in an insert plate 545 which, in turn, is caulked with a collar 547 of the valve shut-off plate 542. In a recess in the valve shut-off plate 542 there rests an auxiliary valve plate 549 which is pretensioned upwardly in a direction toward the insert plate 545 by a conical spiral spring 551. This auxiliary valve plate has a small central bore 549a and greater marginal cut-outs 549b. A ram 550h which, in the lowered condition of the magnet armature 550, strikes against the auxiliary valve plate 549 and lifts it from the insert plate 545 is disposed on the magnet armature 550. In the condition shown in FIG. 7 with de-energised field winding, the connection between the control chamber 560 and the central channel 538 has a greater cross section which is determined by the marginal cut-outs 549b. This greater cross section ensures that a pressure can build up rapidly inside the control chamber 560, this pressure corresponding to the pressure in the central channel 538 and ensuring that the valve shut-off plate 542 is pressed against the valve seat 540. Spring 546 urges the valve shut-off plate 542 against the valve seat 540. Magnet armature 550 is pretensioned downwardly in the direction of the shut-off valve plate 542 by magnet armature pretensioning spring 552 and can be pulled upwardly by field winding 554.

When the magnet armature 550 is attracted upwardly, the ram 550h lifts from the auxiliary valve plate 549 so that the auxiliary valve plate 549 rests against the insert plate 545 and covers the marginal cut-outs 549b. Thereafter, only the small bore 549a is available as a connection between the central channel 538 and the control chamber 560. Preliminary opening cross sections which are smaller than the minimum cross sections for supplying the control space 560 can then be brought about for forming the damping characteristic. In a further embodiment (not shown) which is similar to the embodiment shown in FIG. 7, an auxiliary valve plate corresponding to auxiliary valve plate 549 of FIG. 7 has marginal cut-outs corresponding to marginal cut-outs 549b, but does not have a central bore.

Figure 8:
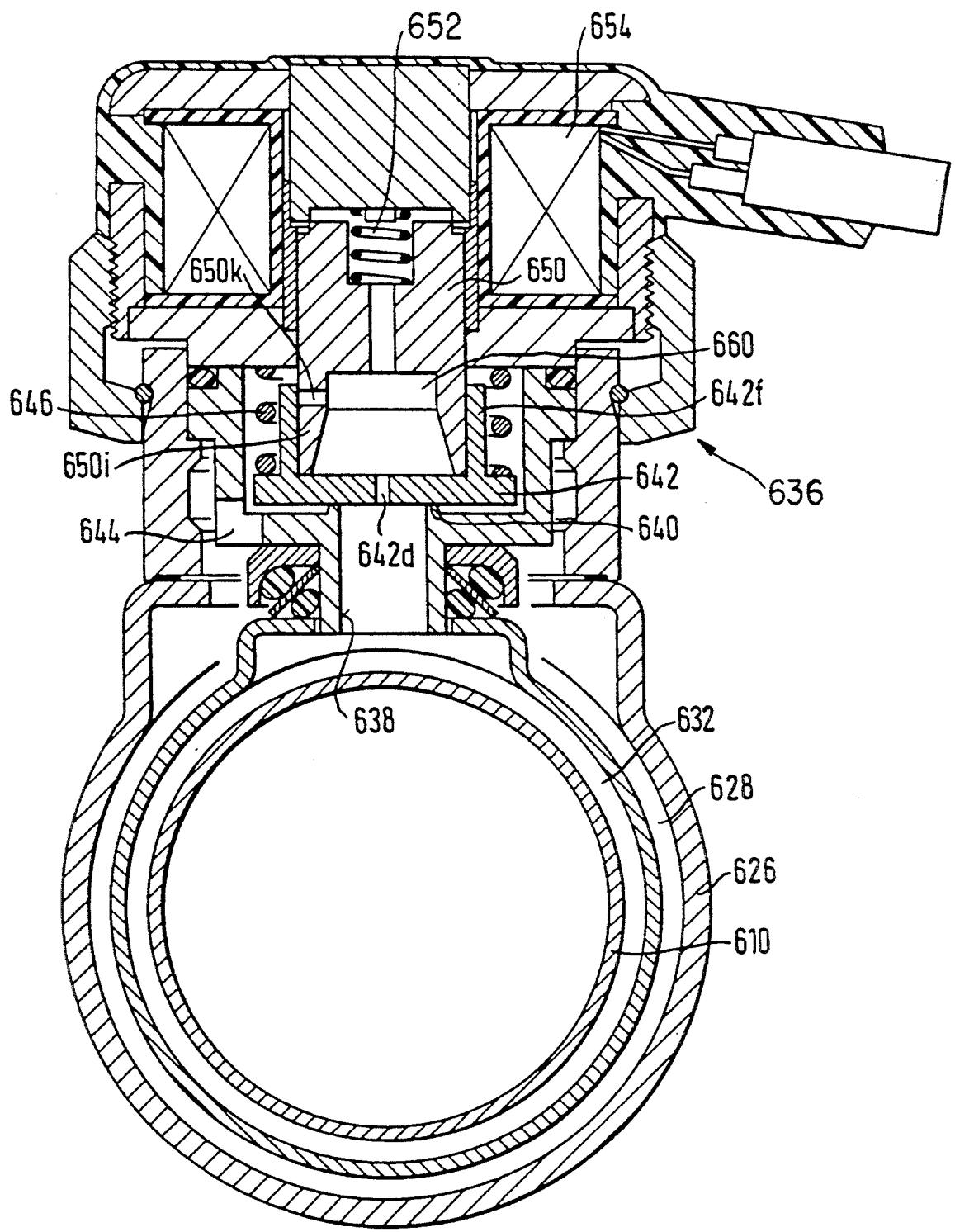
FIG. 8 shows a seventh embodiment of the shutoff valve component.

In FIG. 8, similar parts are provided with the same reference numerals as in FIG. 2, increased by the number 600 in each case.

In this embodiment, a sliding sleeve 642f into which the magnet armature 650 engages with a sliding projection 650i is shaped integrally on the shut-off valve plate 642. The sliding projection 650i has a radial bore 650k. When the sliding projection 650i travels upwardly with the magnet armature 650 against the force of pretensioning spring 652 when current is applied to the field winding 654, the radial bore 650k passes over the upper end of the sliding sleeve 642f so that the control chamber 660 communicates with the compensating chamber 628 and the pressure in the control chamber 660 collapses. Furthermore, the mode of operation of this embodiment corresponds to that according to FIG. 2.

FIG. 8 shows the container tube 626, the cylinder 610, the first portion 632 of the bypass, and the compensating chamber 628 in cross section. A central channel 638 pertaining to the valve component 636 connects to the first portion 632. A valve seat 640 is constructed at the upper end of the central channel 638. Shut-off valve plate 642 rests on the valve seat 640. The shut-off valve plate 642 is traversed by a throttle bore 642d connecting the central channel 638 and a control chamber 660.

In the position shown in FIG. 8, the connection between the central channel 638 and the compensating chamber 628 is substantially closed. When the shut-off valve plate 642 lifts from the valve seat 640, liquid can travel from the central channel 638 past the valve seat 640 beneath the shut-off valve plate 642 through bores 644 (only one of which is shown) into the compensating chamber 628. The shut-off valve plate 642 is pretensioned in the direction of the valve seat 640 by a helical pressure spring 646. The magnet armature 650 is pretensioned downwardly in the direction of the shut-off valve plate by the magnet armature pretensioning spring 652 and can be pulled upwardly by the field winding 654.

Figure 9:
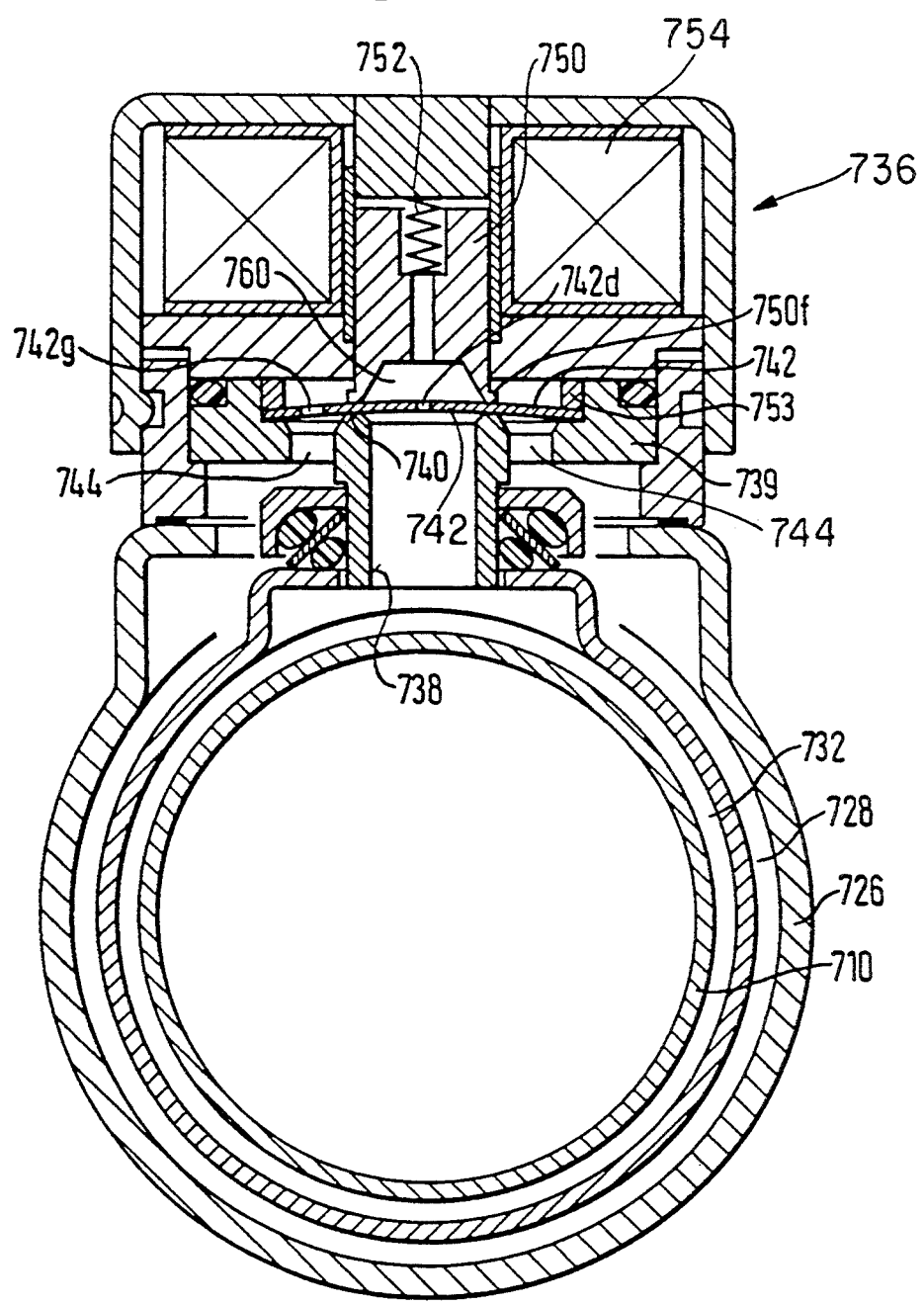
FIG. 9 shows a eighth embodiment of the shut-off valve component.

In FIG. 9, similar parts are provided with the same reference numerals as in FIG. 2, increased by the number 700 in each case.

In this embodiment of the valve component 736, a Belleville spring washer 742 which is clamped on a valve seat plate 739 by a supporting ring 753 and screens itself through by resting on the valve seat 740 is provided as a shut-off valve element. The outlet bores 744 to the compensating chamber 728 are arranged beneath the Belleville spring washer 742 and bores 742g are therefore provided in the Belleville spring washer 742. The magnet armature 750 lies with its margin 750f against the Belleville spring washer 742 to form the control chamber 760. The spring 46 in FIG. 2 is dispensed with owing to the initial tension of the Belleville spring washer 742.

Providing the magnet armature 750 adopts its lower position according to FIG. 9 and the control chamber 760 is closed, the pressure in the control chamber 760 acts upon the Belleville spring washer 742 so that the Belleville spring washer 742 can also withstand high pressures at the central channel 738. If the magnet armature 750 is raised, the pressure in the control chamber 760 collapses and the Belleville spring washer 742 can be lifted from the valve seat 740 by the dynamic pressure forming in the central channel 738.

FIG. 9 shows the container tube 726, the cylinder 710, the first portion 732 of the bypass, and the compensating chamber 728 in cross section. The Belleville spring washer 742 is traversed by a throttle bore 742d connecting the central channel 738 and the control chamber 760. The magnet armature 750 is pretensioned downwardly in the direction of the Belleville spring washer 742 by a magnet armature pretensioning spring 752 and can be pulled upwardly by a field winding 754.

Figure 10:
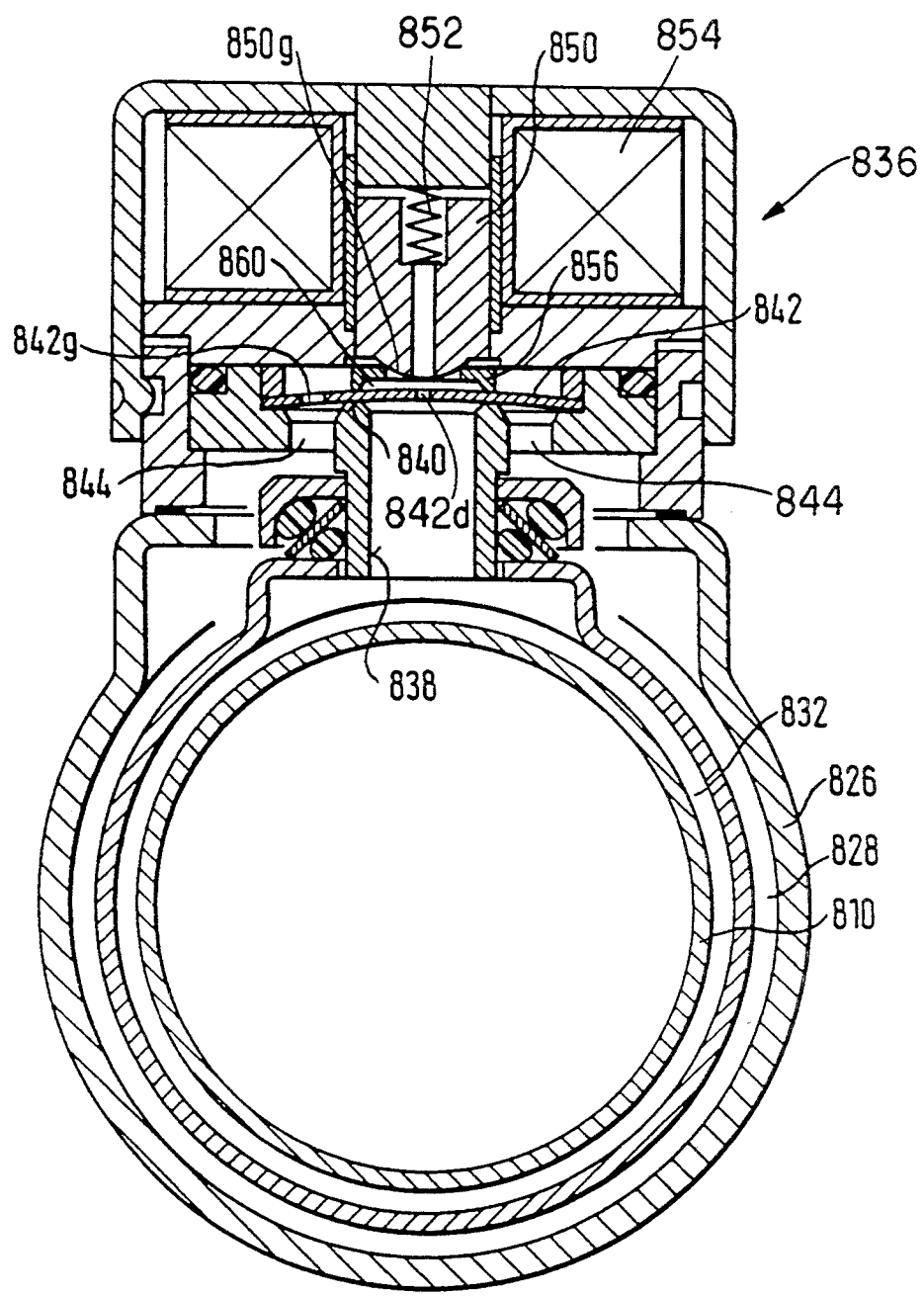
FIG. 10 shows a ninth embodiment of the shut-off valve component.

In FIG. 10, similar parts are provided with the same reference numerals as in FIG. 2, increased by the number 800 in each case.

This embodiment is derived from the embodiment according to FIG. 9, but differs from it since an annular intermediate member 856 which rests on a spherical dome 850g of the magnet armature 850 is arranged between the magnet armature 850 and the Belleville spring washer 842 (see FIGS. 5, 7, 6). Furthermore, the embodiment according to FIG. 10 corresponds to the one according to FIG. 9 and functions similarly to the embodiment according to FIG. 9.

FIG. 10 shows the container tube 826, the cylinder 810, the first portion 832 of the bypass, and the compensating chamber 828 in cross section. A central channel 838 pertaining to the valve component 836 connects to the first portion 832. A valve seat 840 is constructed at the upper end of the central channel 838. Belleville spring washer 842 is traversed by a throttle bore 842d connecting the central channel 838 and a control chamber 860.

In the position shown in FIG. 10, the connection between the central channel 838 and the compensating chamber 828 is substantially closed. When the Belleville spring washer 842 lifts from the valve seat 840, liquid can travel from the central channel 838 past the valve seat 840 beneath the shut-off valve plate 842 through holes 842g provided in the Belleville spring washer 842 and bores 844 into the compensating chamber 828. Magnet armature 850 is pretensioned downwardly in the direction of the shut-off valve plate 842 by a magnet armature pretensioning spring 852 and can be pulled upwardly by a field winding 854.

Figure 11:
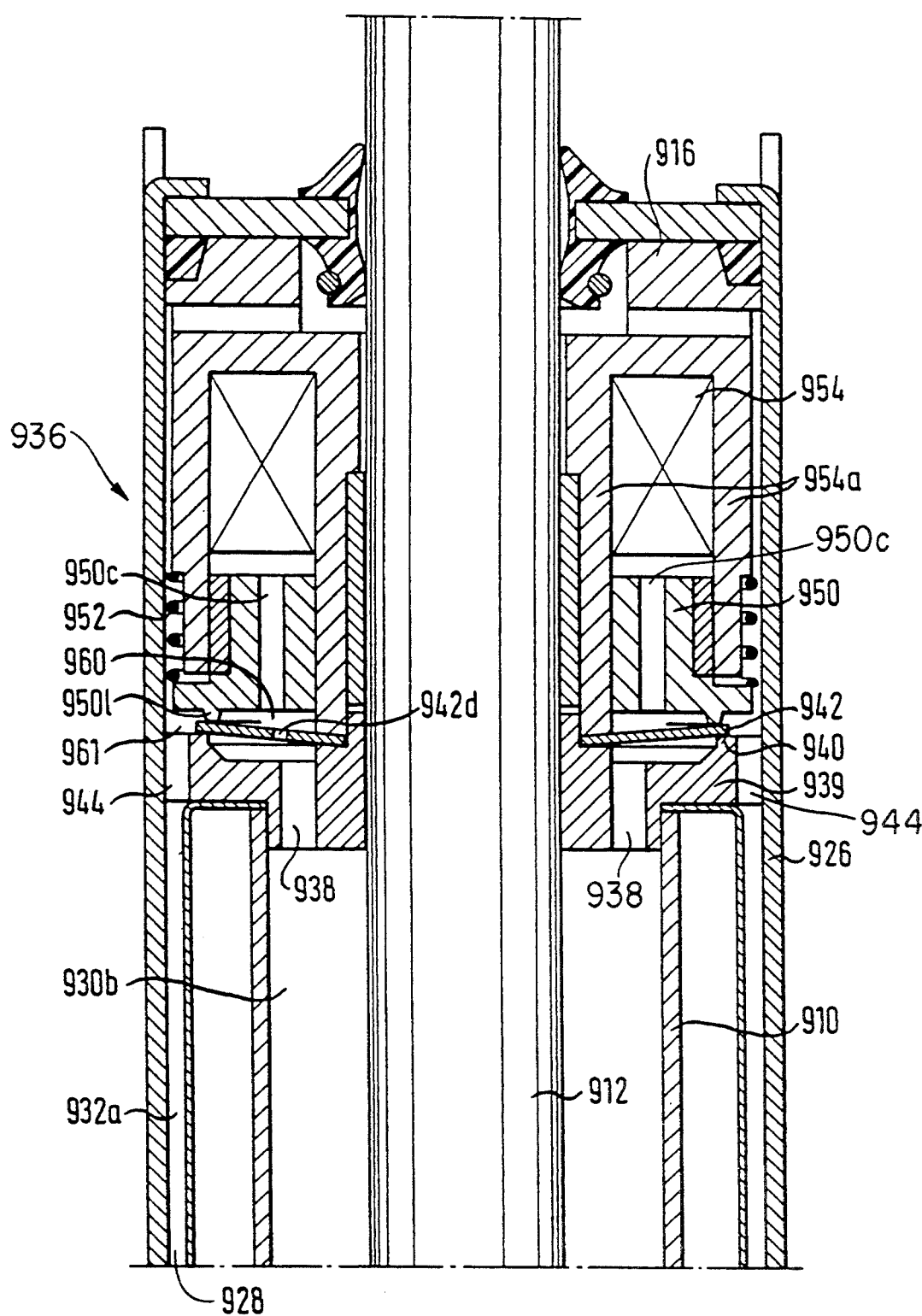
FIG. 11 shows a tenth embodiment of the shut-off valve component.

An annular valve seat plate 939, on which a valve seat 940 is constructed and a Belleville spring washer-type shut-off valve plate 942 is clamped centrally by a field winding housing 954a, can be seen at the upper end of the cylinder 910 and of the container 926 in FIG. 11. The outer margin of the shut-off valve plate 942 rests under initial spring tension on the valve seat 940. An annular magnet armature 950 rests with a collar 9501 directly on the shut-off valve plate 942 and is pressed downwardly by a magnet armature pretensioning spring 952. It can be attracted upwardly by the flow of current in the field winding 954.

Bores 938 which lead directly from the upper working chamber 930b to the space beneath the shut-off valve plate 942 are provided in the valve seat plate 939. An annular space 961 radially outside the shut-off valve plate 942 is connected by recesses 944 in the valve seat plate 939 and a line 932a to the liquid-containing region of the compensating chamber 928.

The spring 46 in FIG. 2 is again dispensed with here owing to the initial tension of the Belleville spring washer-type shut-off valve plate. The control chamber 960 is annular, the magnet armature 950 is traversed by bores 950c which convey the pressure inside the control chamber 960 to the rear of the magnet armature 950 so that the magnet armature 950 is essentially pressure-compensated. Here in the condition shown in FIG. 11, when the magnet armature 950 is pressed downwardly by the spring 952, a pressure develops in the control chamber 960 by means of the opening 942d which corresponds essentially to the pressure in the upper working chamber 930b. This pressure acts upon the upper side of the shut-off valve plate 942 and presses it against the valve seat 940. If the magnet armature 950 is lifted by the flow of current in the coil 954, the pressure in the control space 960 collapses and the shut-off valve plate 942 can then be lifted against the action of its initial tension by the dynamic pressure prevailing at its underside. The valve component arrangement 936 is centrally traversed by the piston rod 912, which is sealingly guided through sealing and guiding unit 916 at the upper end of the cylinder 910 and the container 926.

This embodiment according to FIG. 11 is characterised by a particularly compact design and by a slim construction of the entire oscillation damper.

It should be added that the throttle section 42d in FIG. 1 need not necessarily be guided through the valve shut-off plate 42 but can also be guided round it.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. Oscillation damper comprising a cylinder with an axis, a piston rod axially movably guided through at least one cylinder end, a piston connected to the piston rod inside the cylinder, a plurality of fluid chambers having capacities which are variable relative to one another as a function of movement of the piston rod relative to the cylinder and at least one fluid connection between two fluid chambers of said plurality of fluid chambers, wherein in said at least one fluid connection there is provided a control valve unit between two portions of said fluid connection, wherein the control valve unit is constructed with valve passage means to which a first portion is connected, and with a valve control element wherein a valve face on a first side of the valve control element can be resiliently urged toward a maximum closing position so as to reduce a flow cross sectional area defined by said valve passage means and said valve control element, wherein a loading face on a second side of the valve control element which is remote from the first side of the valve control element can be loaded by fluid pressure in an adjacent control chamber, wherein the control chamber is connected to the first portion via throttled fluid path means for permitting fluid communication between the first portion and the control chamber even when the valve control element is in the maximum closing position, wherein the control chamber communicates via control chamber outlet means with the second portion, wherein the control chamber outlet means comprises outlet cross section dimensioning means which is adjustable between a maximum closed condition and a maximum open condition without intermediate conditions, substantially perpendicularly to the loading face on the second side of the valve control element in at least one direction by magnetic force and, in cooperation with the second side of the valve control element, determines the outlet cross sectional area of the control chamber outlet means, the control chamber outlet means being closed to a maximum in the maximum closed condition, and the control chamber outlet means being opened to a maximum in the maximum open condition.

2. Oscillation damper according to claim 1, characterized in that the outlet cross section dimensioning means is pretensioned in the direction of said maximum closed condition by pretensioning means, and is transferable into the maximum open condition by magnetic force.

3. Oscillation damper according to claim 1, characterized in that the outlet cross section dimensioning means is pressure loaded by the fluid contained inside the control chamber both at its end facing the valve control element and at its end turned away from the valve control element.

4. Oscillation damper comprising a cylinder with an axis, a piston rod axially movably guided through at least one cylinder end, a piston connected to the piston rod inside the cylinder, a plurality of fluid chambers having capacities which are variable relative to one another as a function of the movement of the piston rod relative to the cylinder and at least one fluid connection between two fluid chambers of said plurality of fluid chambers, said at least one fluid connection being provided with a control valve unit between two portions of said at least one fluid connection, said control valve unit being provided with valve passage means to which a first one of said portions is connected and with a valve control element, a valve face on a first side of said valve control element being resiliently urgeable toward a maximum closing position so as to control the fluid flow through said first portion, a loading face on a second side of said valve control element which is remote from the first side of the valve control element being loadable by fluid pressure in an adjacent control chamber, said control chamber being connected to said first portion via throttled fluid path means for permitting fluid communication between the first portion and the control chamber even when the valve control element is in the maximum closing position, said control chamber being in communication via control chamber outlet means with a second of said portions, said control chamber outlet means comprising movable outlet cross section dimensioning means, movable in a direction substantially perpendicular to said loading face on the second side of said valve control element in response to magnetic force generating means and determining, in cooperation with the second side of said valve control element, an outlet cross sectional area of said control chamber outlet means, said outlet cross section dimensioning means being movable between a maximum closed condition and a maximum open condition, said control chamber outlet means being closed to a maximum in said maximum closed condition and said control chamber outlet means being opened to a maximum in said maximum open condition, said outlet cross section dimensioning means being pretensioned toward said maximum closed condition by pretensioning means and being transferable toward said maximum open condition by said magnetic force generating means, said outlet cross section dimensioning means comprising a magnet armature which is loaded by said pretensioning means and is magnetically movable against the action of said pretensioning means, said outlet cross section dimensioning means having face means facing the valve control element and turned away from the valve control element, both said face means being pressure-loaded by the fluid contained inside the control chamber.

5. Oscillation damper according to claim 4, wherein said pretensioning means contributes through said magnet armature to obtaining an engagement pressure between said valve control element and said valve passage means.

6. Oscillation damper according to claim 5, wherein said magnet armature is accessible to fluid contained in said control chamber.

7. Oscillation damper according to claim 6, wherein said magnet armature has an end face nearer to said valve control element and an end face more remote from said valve control element, both said end faces being accessible to fluid contained in said control chamber.

8. Oscillation damper according to claim 7, wherein, in the absence of an electromagnetic field, said magnet armature is movable by said pretensioning means into a closing position thereof.

9. Oscillation damper according to claim 8, wherein said valve control element is prevented from lifting from said valve passage means when said magnet armature is in its closing position.

10. Oscillation damper according to claim 8, wherein said control chamber outlet means has a maximum closing status and is prevented from being opened beyond said maximum closing status when said magnet armature is in its closing position.

11. Oscillation damper according to claim 4, wherein the magnet armature cooperates directly with the valve control element.

12. Oscillation damper according to claim 1 or 4, wherein said throttled fluid path means extends through said valve control element.

13. Oscillation damper according to claim 1 or 4, wherein said throttled fluid path means is disposed outside said valve control element.

14. Oscillation damper according to claim 1 or 4, characterized in that the valve control element and the outlet cross section dimensioning means are arranged concentrically with a circular contour, and that the throttled fluid path means passes through the valve control element and is arranged radially inside a circular engagement line formed between the valve control element and the outlet cross section dimensioning means.

15. Oscillation damper according to claim 1 or 4, characterized in that the valve control element is pretensioned toward the maximum closing position by a valve pretensioning spring.

16. Oscillation damper according to claim 1 or 4, characterized in that the valve control element is pretensioned resiliently in itself toward the maximum closing position.

17. Oscillation damper according to claim 1 or 4, characterized in that the valve control element offers, on its first side facing the first portion, to the fluid inside the first portion a valve face with a first loading cross sectional area which is equal to or smaller than a second loading cross sectional area which is provided by the loading face on the second side of the valve control element and is loaded by the fluid inside the control chamber.

18. Oscillation damper according to claim 17, characterized in that the first loading cross sectional area is between 15–40%, preferably about 20% of the second loading cross sectional area.

19. Oscillation damper according to claim 1 or 4, characterized in that the outlet cross section dimensioning means comprises a cross section dimensioning module with a magnet armature which is loaded by dimensioning module pretensioning means and is magnetically adjustable against the action of the dimensioning module pretensioning means.

20. Oscillation damper according to claim 19, characterized in that the magnet armature is pretensioned toward the valve control element by the dimensioning module pretensioning means.

21. Oscillation damper according to claim 19, characterized in that between the magnet armature and the valve control element there is arranged an intermediate member which, on the one hand, can be loaded by the magnet armature and, on the other hand, cooperates with the valve control element, said magnet armature and said intermediate member being parts of said cross section dimensioning module.

22. Oscillation damper according to claim 21, characterized in that the intermediate member is in ball joint engagement with the magnet armature.

23. Oscillation damper according to claim 21, characterized in that the intermediate member is bell-shaped in construction, a vertex region of the bell-shaped intermediate member resting against the magnet armature and a marginal region of the intermediate member cooperating with the valve control element.

24. Oscillation damper according to claim 23, characterized in that the marginal region of the bell-shaped intermediate member is formed by a radially outwardly directed marginal flange.

25. Oscillation damper according to claim 23, characterized in that the bell-shaped intermediate member is received in a recess of the magnet armature.

26. Oscillation damper according to claim 23, characterized in that the bell-shaped intermediate member can be engaged with the magnet armature outside its vertex region, and in that a connecting bore which communicates with a through-bore in the magnet armature is provided in the vertex region of the bell-shaped intermediate member.

27. Oscillation damper according to claim 21, characterized in that the intermediate member is pretensioned toward engagement with the valve control element by intermediate member pretensioning means.

28. Oscillation damper according to claim 21, characterized in that the intermediate member is formed by an optionally resilient annular disc.

29. Oscillation damper according to claim 19, characterized in that the magnet armature cooperates directly with the valve control element.

30. Oscillation damper according to claim 1 or 4, characterized in that the outlet cross section dimensioning means with the valve control element forms a sliding seat with a sliding direction which is substantially perpendicular to the loading face on the second side of the valve control element.

31. Oscillation damper according to claim 1 or 4, characterized in that in a fluid connection path between the first portion and the control chamber there is provided an auxiliary valve arrangement which is actuable by the outlet cross section dimensioning means and constricts the throttled fluid path means when the outlet cross sectional area of the control chamber is enlarged, and widens the throttled fluid path means when the outlet cross sectional area of the control chamber is reduced.

32. Oscillation damper according to claim 1 or 4, characterized in that the valve passage means is provided by a central outlet of the first portion, and in that the valve control element and the outlet cross section dimensioning means are arranged concentrically to the central outlet.

33. Oscillation damper according to claim 32, characterized in that a field winding acting on the outlet cross section dimensioning means is arranged concentrically to the central outlet.

34. Oscillation damper according to claim 32, characterized in that pretensioning spring means acting upon the valve control element is arranged concentrically to the central outlet.

35. Oscillation damper according to claim 32, characterized in that pretensioning spring means acting upon the outlet cross section dimensioning means is arranged concentrically to the central outlet.

36. Oscillation damper according to claim 1 or 4, characterized in that the control valve unit is disposed in a casing region of the cylinder such that a central channel, leading to the valve passage means, of the first portion, and a direction of movement of the valve control element and of the outlet cross section dimensioning means lie substantially radially to the cylinder axis.

37. Oscillation damper according to claim 1 or 4, characterized in that the control valve unit is positioned concentrically to the cylinder axis in an annular space between the piston rod and the cylinder in the region of the cylinder end traversed by the piston rod.

38. Oscillation damper according to claim 1 or 4, characterized in that the oscillation damper is constructed as a twin tube oscillation damper with two working chambers, separated from one another by the piston, inside the cylinder, namely a first working chamber between the piston and a base end of the cylinder and a second working chamber inside the cylinder between the piston and the end of the cylinder traversed by the piston rod and with a compensating chamber, wherein the two working chambers are filled with pressure liquid and the compensating chamber is filled partially with pressure liquid and partially with gas, wherein the first working chamber is connected to the compensating chamber by a base valve arrangement, wherein the two working chambers are connected to one another by a piston valve arrangement, wherein the second working chamber is connected via a bypass to the compensating chamber and wherein the control valve unit is arranged in the bypass.

39. Oscillation damper according to claim 38, characterized in that the piston valve arrangement has a greater flow resistance during an extension movement of the piston rod relative to the cylinder than during a retraction movement of the piston rod relative to the cylinder and in that the base valve arrangement has a greater flow resistance during the retraction movement of the piston rod relative to the cylinder than the piston valve arrangement such that a flow takes place from the second working chamber through the bypass line to the compensating chamber both during a retraction movement and during an extension movement.

40. Oscillation damper according to claim 1 or 4, wherein said fluid connection is arranged on the outside of said cylinder.

41. Oscillation damper according to claim 1 or 4, wherein said control valve unit is fixed with respect to said cylinder.

42. Oscillation damper comprising a cylinder with an axis, a piston rod axially movably guided through at least one cylinder end, a piston connected to the piston rod inside the cylinder, a plurality of fluid chambers having capacities which are variable relative to one another as a function of the movement of the piston rod relative to the cylinder and fluid connections between fluid chambers of said plurality of fluid chambers, at least one of said fluid connections being provided with a control valve unit between two portions of said fluid connection, said control valve unit being provided with valve passage means to which a first one of said portions is connected and with a valve control element, a first side of said valve control element being resiliently urgeable toward a maximum closing position so as to reduce a flow cross sectional area defined by said valve passage means and said valve control element, a second side of said valve control element which is remote from the first side of the valve control element being loadable by fluid pressure in an adjacent control chamber, said control chamber being connected to said first portion via a throttled fluid path extending across the valve control element, said control chamber being in communication via control chamber outlet means with a second one of said portions, said control chamber outlet means having allocated thereto outlet cross section dimensioning means, said outlet cross section dimensioning means comprising a cross section dimensioning module which is movable substantially perpendicularly to said second side of said valve control element by magnetic force generating means and which, in cooperation with the second side of said valve control element, determines the outlet cross section of said control chamber outlet means,
said cross section dimensioning module being movable between a maximum closed condition and a maximum open condition without intermediate positions, said control chamber outlet means being closed to a maximum in said maximum closed condition, and said control chamber outlet means being opened to a maximum in said maximum open condition,
said cross section dimensioning module being pretensioned in the direction of said maximum closed condition by a pretensioning device and being transferable into said maximum open condition by said magnetic force generating means, as said cross section dimensioning module comprises a magnet armature which is loaded by said pretensioning device and is magnetically movable against the action of said pretensioning device,
said cross section dimensioning module having an end facing the valve control element and an end turned away from the valve control element, both said ends being pressure-loaded by the fluid contained inside the control chamber.

43. Oscillation damper according to claim 42, wherein said fluid connection is arranged on the outside of said cylinder.

44. Oscillation damper according to claim 42, wherein said control valve unit is fixed with respect to said cylinder.

45. Oscillation damper according to claim 1, 4 or 42, wherein the second side of the valve control element, which cooperates with the outlet cross section dimensioning means in determining the outlet cross sectional area, is substantially flat.

46. Oscillation damper according to claim 1, 4 or 42, wherein the second side of the valve control element, which cooperates with the outlet cross section dimensioning means in determining the outlet cross sectional area, comprises an annular rib.

47. Oscillation damper according to claim 1, 4 or 42, wherein the second side of the valve control element, which cooperates with the outlet cross section dimensioning means in determining the outlet cross sectional area, comprises a sliding sleeve.

* * * * *

UNITED STATES PATENT AND TRADEMARK OFFICE
CERTIFICATE OF CORRECTION

PATENT NO. : 5,439,085
DATED : August 8, 1995
INVENTOR(S) : Felix Woessner

It is certified that error appears in the above-indentified patent and that said Letters Patent is hereby corrected as shown below:

Col. 7, line 21, "shut,off" should read --shut-off--;
Col. 8, line 46, "seated/when" should read --seated, when--;
Col. 8, line 46, "rises" should read --rises,--;
Col. 9, line 30, "space" should read --chamber--; (2nd occurrence)
Col. 10, line 31, "direct-by" should read --directly--;
Col. 17, line 7, "20%" should read --20%,--.

Signed and Sealed this

Fifth Day of March, 1996

Attest:

BRUCE LEHMAN

*Attesting Officer*     *Commissioner of Patents and Trademarks*